US009261973B2

(12) United States Patent
McKenzie et al.

(10) Patent No.: US 9,261,973 B2
(45) Date of Patent: Feb. 16, 2016

(54) METHOD AND SYSTEM FOR PREVIEWING CHARACTERS BASED ON FINGER POSITION ON KEYBOARD

(71) Applicant: Research In Motion Limited, Waterloo (CA)

(72) Inventors: Donald Somerset McCulloch McKenzie, Waterloo (CA); Jerome Pasquero, Montreal (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 104 days.

(21) Appl. No.: 13/912,458

(22) Filed: Jun. 7, 2013

(65) Prior Publication Data

US 2014/0361993 A1    Dec. 11, 2014

(51) Int. Cl.
*G06F 3/02* (2006.01)
*G06F 3/023* (2006.01)
*G06F 3/0488* (2013.01)

(52) U.S. Cl.
CPC .......... *G06F 3/0237* (2013.01); *G06F 3/04886* (2013.01)

(58) Field of Classification Search
CPC . G06F 3/0237; G06F 3/04886; G06F 3/0236; G06F 3/0489; G06F 3/0233; G06F 3/041; H01H 13/83; H01H 13/84; H01H 2217/032; H01H 2217/038; H01H 2239/006; H01H 2239/052; H01H 2239/074; H01H 2300/054; H03K 2217/96054
USPC .................. 345/168–184; 715/773
See application file for complete search history.

(56) References Cited

U.S. PATENT DOCUMENTS

| | | | |
|---|---|---|---|
| 5,442,547 A | 8/1995 | Kutsumi et al. | |
| 6,223,059 B1 | 4/2001 | Haestrup | |
| 6,894,679 B2 * | 5/2005 | Suzuki | 345/169 |
| 8,185,841 B2 | 5/2012 | Rainisto | |
| 2004/0095327 A1 | 5/2004 | Lo | |
| 2006/0012494 A1 | 1/2006 | Park et al. | |
| 2008/0091410 A1 | 4/2008 | Benson | |
| 2008/0281583 A1 | 11/2008 | Slothouber et al. | |
| 2009/0113299 A1 | 4/2009 | Chung | |
| 2009/0289898 A1 | 11/2009 | Perera | |
| 2010/0225599 A1 | 9/2010 | Danielsson et al. | |
| 2010/0292984 A1 | 11/2010 | Huang et al. | |
| 2011/0010655 A1 | 1/2011 | Dostie et al. | |

(Continued)

FOREIGN PATENT DOCUMENTS

EP    2568370 A1    3/2013
WO    2013002779 A1    1/2013

OTHER PUBLICATIONS

Extended European Search Report dated Nov. 14, 2013, issued in European Patent Application No. 13170985.9.

*Primary Examiner* — Kent Chang
*Assistant Examiner* — Nelson Rosario
(74) *Attorney, Agent, or Firm* — Fish & Richardson P.C.

(57) ABSTRACT

Systems and methods are provided for detecting a touch of a first key associated with a first character on the keyboard, detecting a touch of a second key corresponding to a second character on the keyboard, determining an order for previewing the first and second characters in response to the detecting, and previewing the first and second characters in the determined order in an information entry field of the electronic device.

7 Claims, 3 Drawing Sheets

(56) References Cited

U.S. PATENT DOCUMENTS

| | | |
|---|---|---|
| 2011/0057903 A1* | 3/2011 | Yamano et al. ............... 345/174 |
| 2011/0090151 A1 | 4/2011 | Huang et al. |
| 2011/0208512 A1 | 8/2011 | Gao |
| 2011/0285555 A1 | 11/2011 | Bocirnea |
| 2012/0011462 A1* | 1/2012 | Westerman et al. .......... 715/773 |
| 2012/0092278 A1 | 4/2012 | Yamano |
| 2012/0119997 A1 | 5/2012 | Gutowitz |
| 2012/0149477 A1 | 6/2012 | Park et al. |
| 2012/0223889 A1 | 9/2012 | Medlock et al. |
| 2013/0135243 A1* | 5/2013 | Hirsch ................... H01H 13/83 345/173 |
| 2014/0297267 A1* | 10/2014 | Spencer et al. ................... 704/9 |
| 2014/0317547 A1* | 10/2014 | Bi et al. ........................ 715/773 |

* cited by examiner

METHOD AND SYSTEM FOR PREVIEWING CHARACTERS BASED ON FINGER POSITION ON KEYBOARD

BACKGROUND

The present disclosure relates to electronic devices, including, but not limited to handheld electronic devices, and their control.

Electronic devices, including portable electronic devices, have gained widespread use and provide many functions requiring the use of a keyboard to enter text or instructions. Keyboards may be implemented on electronic devices as physical keyboards or as touch-sensitive displays. Smaller devices are often desirable for portability, and space can be limited for user input and output. Improvements in devices utilizing keyboards are desirable.

BRIEF DESCRIPTION OF THE DRAWINGS

This specification will now describe embodiments of the present disclosure, by way of example only, by referring to the attached figures, described below.

DETAILED DESCRIPTION

Figure 1:
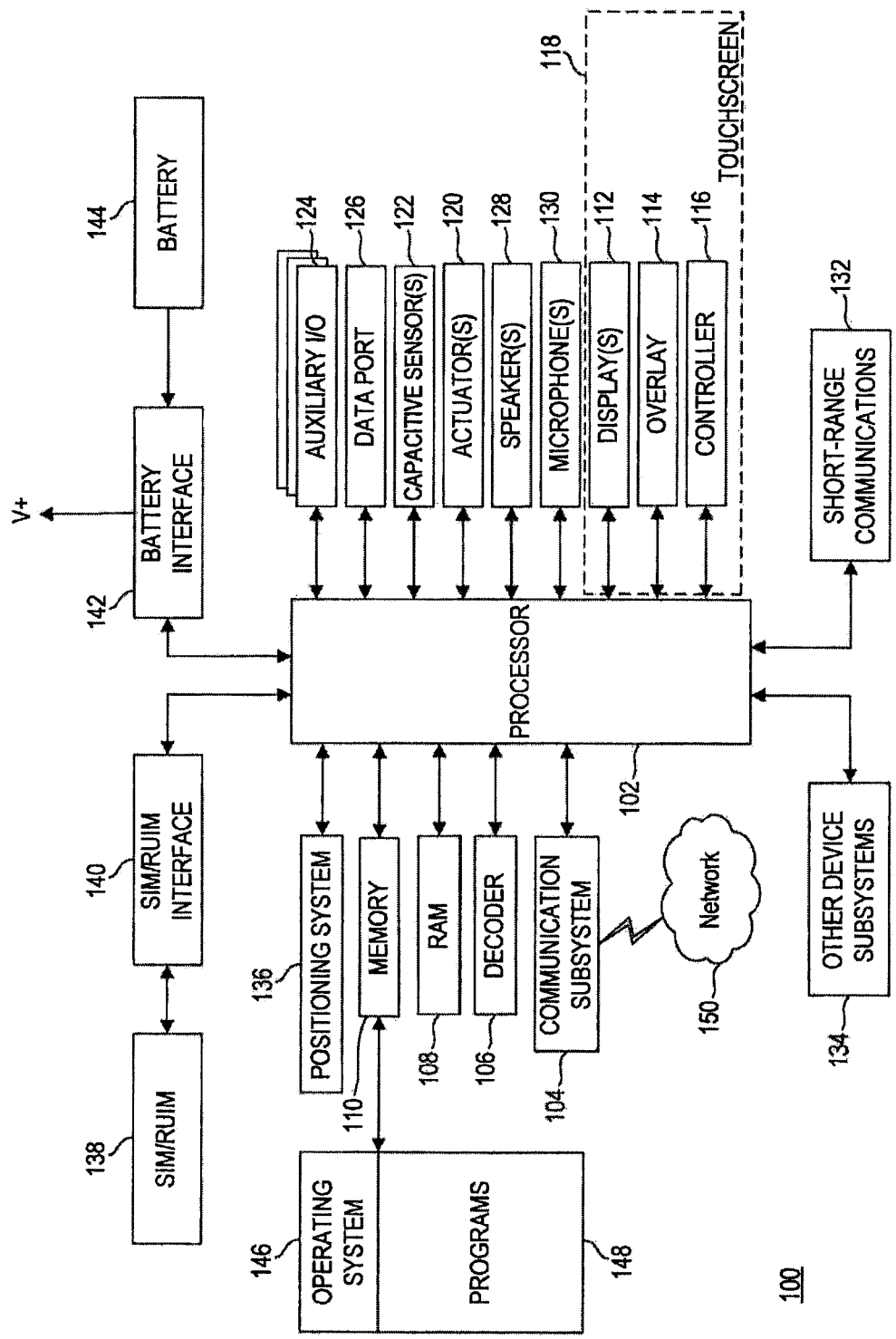
FIG. 1 is a block diagram of an example electronic device.

For simplicity and clarity of illustration, where considered appropriate, this specification repeats reference numerals among the figures to indicate corresponding or analogous elements. In addition, this specification provides numerous specific details to provide a thorough understanding of the described embodiments. In some instances, aspects of this disclosure may be practiced without some specific details. In other instances, well-known methods, procedures, and components have not been described in detail so as not to obscure the described embodiments. Also, the described embodiments do not limit the claims or the scope of the embodiments.

Examples of electronic devices according to this disclosure include personal computers (PCs), laptops, workstations, mobile or handheld wireless communication devices such as pagers, cellular phones, cellular smartphones, wireless organizers, personal digital assistants, wirelessly enabled notebook computers, and the like. Depending on the functionality provided by the communication device, it might be referred to as a data-messaging device, a tablet, a cellular telephone, a wireless Internet appliance, or a data-communication device (with or without telephony capabilities).

Keyboards for use with electronic devices may be traditional physical keyboards, which have keys that can be depressed to result in entry of a character. Physical keyboards include capacitive keyboards, as well as other technologies. Keyboards may also be touch-sensitive display keyboards.

When using a keyboard on an electronic device, users often look at the information entry field, rather than the keyboard, when typing. In many instances, the user may enter a wrong character because he was not aware of the position of his digits (fingers) on the keyboard. Such errant entry slows down the user's operation of the electronic device. Full-sized physical keyboards, such as those used for laptops or PCs assist the user in knowing his finger position by their having a physical indicator, often a raised bump, on certain keys. For example, the "F" and "J" keys on a physical QWERTY-type keyboard, where the user's index fingers typically rest in traditional typing position, often have raised bumps so that the user, without looking, can sense that his fingers are resting in a known position on the keyboard. Although it is also useful for full-sized keyboards, the apparatus and method of the present disclosure is especially useful in smaller electronic devices having smaller-sized keyboards, on which a user may more typically rest fewer digits, and which may not be large enough to allow for physical indicators (such as printing or raised bumps) on the smaller keys to demonstrate to the user where his finger(s) rest.

Some keyboards may allow the sensing of touch, without depression of a physical key, or with less depression or presence on a physical key than that which is required for entry of the character associated with the key. When a touch that meets a threshold is detected on such keyboards, at least one character associated with the physical key may be previewed in response to the detecting. The preview format may be a format different than the format of information previously entered in an information entry field. Previewed characters may be entered or subsequently changed. In such systems, a user may touch several keys, and a preview of all touched keys may be desirable. Methods and systems for displaying, for example, by previewing, prior to entering characters associated with the touched physical keys can reduce errant character entries. Further, determining an order for displaying the multiple characters associated with the touched keys may allow the user to more quickly accomplish tasks using the electronic device.

According to one disclosed embodiment, a method for operating an electronic device having a keyboard comprises detecting a touch of a first key associated with a first character on the keyboard, detecting a second key corresponding to a second character on the keyboard, determining an order for previewing the first and second characters in response to the detecting, and previewing the first and second characters in the determined order in an information entry field on the electronic device. The determining the order may be based on one or more rules. For example, determining the order may comprise using a word prediction engine to identify a word prediction candidate, and wherein the order for previewing the first and second characters is an order of the first and second characters in the word prediction candidate.

In another disclosed embodiment, a communication device includes a display device, one or more processors, one or more memories, and instructions to one or more memories. The instructions, when executed by the one or more processors, cause the communication device to perform the steps of: detecting a touch of a first key associated with a first character on the keyboard, detecting a second key corresponding to a second character on the keyboard, determining an order for previewing the first and second characters in response to the detecting, and previewing the first and second characters in the determined order in an information entry field on the electronic device.

In another disclosed embodiment, the determining the order may comprise determining a relative keyboard position of the first key to the second key and setting the order based on the relative keyboard position. In yet another disclosed embodiment, determining the order may comprise determining which of the first key and second key was touched first in time, and selected the character corresponding to the key touched first in time as first in the order. Determining the order may also or alternatively comprise determining which of the first character and second character is most-used, and selecting the character that is most-used as first in the order. Additionally, or alternatively, determining the order may comprise selecting a pre-set order for the combination of the first key and second key. In some embodiments, particularly, when a touch is detected on a key associated with a previously-entered character, the touch (or associated previously-entered character) may be ignored in determining the order.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, an instant message, or a web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Main processor 102 is coupled to and can interact with additional subsystems such as a Random Access Memory (RAM) 108; a memory 110, such as a hard drive, CD, DVD, flash memory, or a similar storage device; one or more actuators 120; one or more capacitive sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are input when, for example, a user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a digit, such as a finger, a swipe by a digit, a swipe by a stylus, a long press by a digit or a stylus, or a press by a digit for a predetermined period of time, and the like.

While specific embodiments of a touchscreen are described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Figures 3A, 3B:
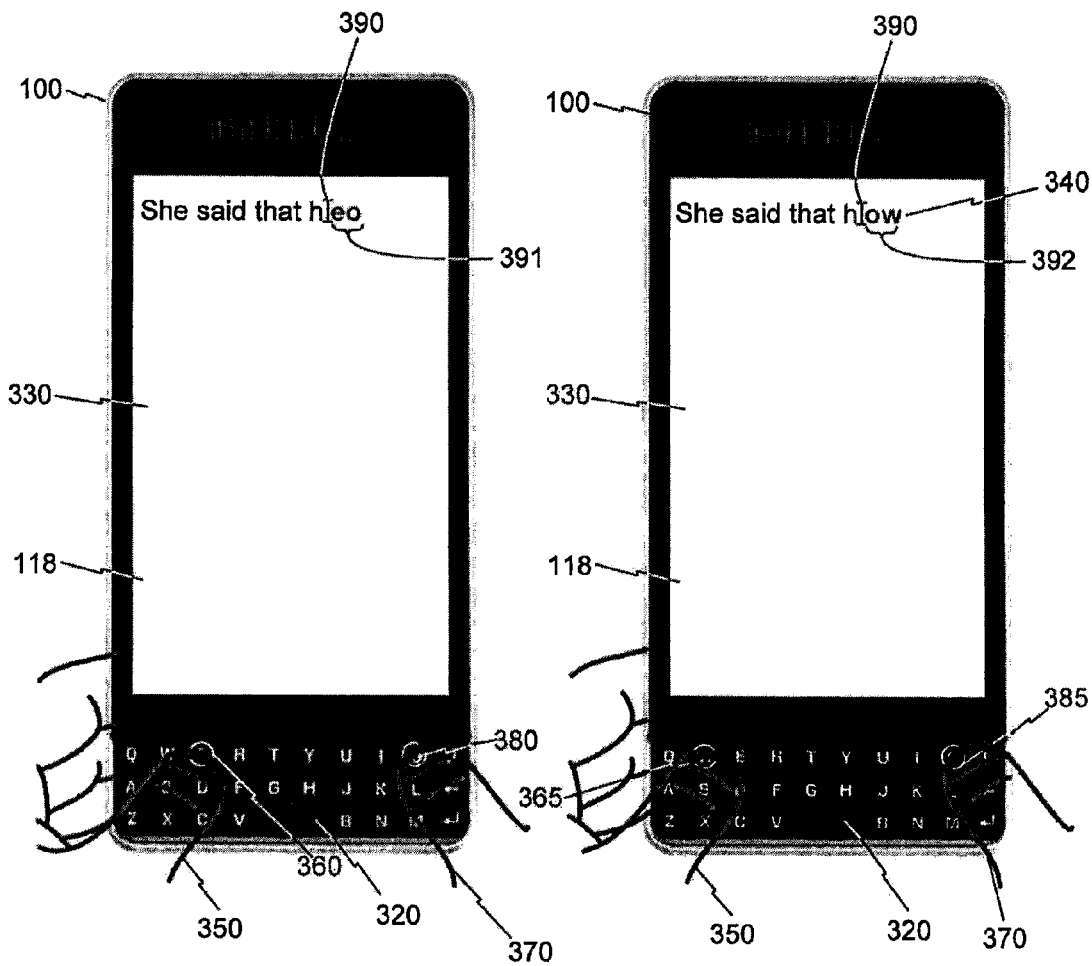
FIGS. 3A and 3B are front views of an example electronic device with characters previewed on the display in an alternate format in accordance with the disclosure.

A keyboard 320 may optionally be included in an electronic device. FIGS. 3A and 3B show example electronic device 100 having a keyboard 320. In some embodiments, keyboard 320 is a capacitive physical keyboard, comprising a series of input members comprising key covers overlaid on top of physical or electronic dome switches. Further, the capacitive physical keyboard contains actuators 120 and capacitive sensors 122 that permit both tactile input via depression of the key covers on top of the actuators 120 and gesture input via capacitive sensors 122. The input resolution of keyboard 320 is at least to the level of a single input member; in other words, responsive to an input received via keyboard 320, processor 102 is capable of detecting which one of the plurality of input members of keyboard 320 was contacted. Processor 102 may be capable of detecting multiple simultaneous, or near simultaneous, contacts on the input members of keyboard 320.

In some embodiments, an input received via keyboard 320 can be localized to precise coordinates in the X and Y directions on the keyboard via capacitive sensors 122. Alternatively, keyboard 320 may be a virtual keyboard displayed on touchscreen 118. In some embodiments, keyboard 320 can additionally sense the position of a digit hovering proximal to one or more input members of the keyboard, such as a thumb or finger of a user, or a stylus. Hovering digits may be sensed by capacitive sensors 122, and may, in some embodiments be interpreted as a "touch."

Figure 2:
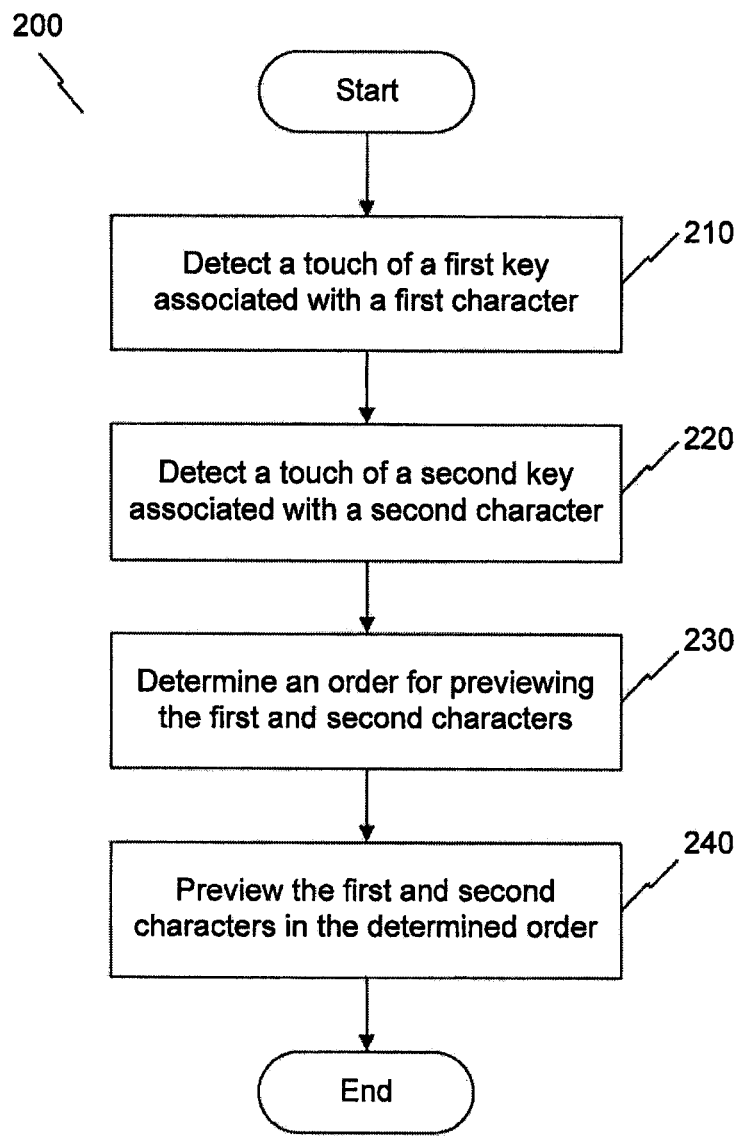
FIG. 2 is a flowchart of an example method for operating an electronic device having a keyboard.

FIG. 2 illustrates an example of a method 200 for operating an electronic device having a keyboard 320. In alternate embodiments, method 200 may operate on an electronic device utilizing a virtual keyboard. Method 200 begins with processor 102 detecting a touch of a first key associated with a first character on the keyboard 320 (step 210). For example, processor 102 may receive an indication that digit 350 has touched a key 360 corresponding to letter "E" on keyboard 320. In some embodiments, the processor 102 may be configured to detect a touch when the operation by digit 350 has met or exceeded a threshold value. The threshold may be a time threshold, a force threshold, an actuation threshold, a capacitive threshold, and so forth. In step 220, processor 102 detects a touch of a second key corresponding to a second character on the keyboard 320. For example, processor 102 may receive an indication that digit 370 has touched a key 385 corresponding to the letter "O" on keyboard 320.

Having detected touches of a first and second key, in step 230, processor 102 determines an order for previewing the first and second characters. Previewed characters are not entered into the information entry field or input to the electronic device, but rather are displayed prior to entry of any character. A character associated with a key may be previewed by displaying information associated with the at least one character, for example, in a preview format. A preview format may be any suitable format, such as a noticeably different format than the format of information previously entered in the information entry field. For example, when information is previewed in the information entry field, a character may be displayed in a ghosted, faded, highlighted, shadowed, shaded, underscored, italicized, bolded, blinking, animated, encircled, or other version of the character, which format is different than the format of the information entered in the information entry field. Preview formatting may also include a different color or font, as well as different size, e.g., enlarged or shrunken version, of the character.

In the example shown in FIG. 3A, text is in the process of being completed, and a ghosted preview 394 is provided to preview the characters "eo" in response to touches detected on the keys 360 and 380 labeled "E" and "O." Thus, characters for keys may be previewed in a visible manner before being entered or input by a user. For example, a character may be displayed in an alternate format without entering the character in the text field. The electronic device provides the user with the ability to change the previewed character prior to entry in the information entry field. When digits 350 or 370 are moved to different keys, the previewed characters may be updated.

When one of the keys is actuated or selected, and the key is associated with a character, the character indicated for selection is entered or input in the information entry field and displayed, for example, in the format of information previously entered in the information entry field, which may be referred to as a normal, standard, or default format.

A user may hover over or touch several different keys before selecting or actuating one. It should be noted that touches may be detected on more than two keys, and the methods and systems described herein may be used when more than two keys are touched, for example, when three or more keys are touched. A preview of each of the different characters associated with the keys may be provided as long as a touch is detected meeting the threshold for each option. When the touch does not meet the threshold, the preview may be discontinued. Processor 102 may use one or more rules to determine how to order the characters, for example, the first and second characters, for preview in step 230. Five exemplary rules are described below. Once processor 102 determines the order, the characters, for example the first and second characters, are previewed in the information entry field (on viewing pane 330) of the electronic device in step 240.

Exemplary previews are shown in FIGS. 3A and 3B as preview 391 and 392. Preview formatting may be utilized in conjunction with a cursor, such as cursor 390, also shown in FIGS. 3A and 3B. Combinations of formatting may be utilized, such as bold, italics, and underlined in an off color, or highlighted with a cursor, and so forth. The previewed character may be displayed after the last character entered in the information field, e.g., next to any previously entered character. Alternatively, the previewed selection option may be displayed in an information field shaped like a balloon, box, or window in a location that is remote from the location of the touch such that the information is visible.

In a first example of a rule, processor 102 may determine the relative position of the touched keys on keyboard 320, and may order the previewed characters according to their relative position. As shown in FIG. 3A, the "E" key 360 touched by digit 350 is to the left of the "O" key 380 touched by digit 370. The electronic device 100 may be configured such that the preview shows the left-most key first or the right-most key first, thereby setting the order based on the relative keyboard position. As shown in FIG. 3A, processor 102 may show a preview 391 of the characters "eo" according to a rule dictating that the left-most key should be first in the determined order.

In a second example of a rule, processor 102 may determine which of the characters is most used, and may order the previewed characters according to their usage frequency. For example, the processor 102 may determine that the letter "e" has been more frequently used, and may select the character that is most-used as first in the order. In some embodiments, the measure of usage frequency may be in a fixed time window, for the lifetime of the electronic device, or may be the usage frequency in the common vernacular of the electronic device's operating language (e.g., English).

In a third example of a rule, the processor 102 may be programmed to display combinations of keys in a pre-set order. Whenever, for example, processor 102 senses touches on the "E" and "O" keys 360 and 380, the processor 102 may be configured to show a preview "eo" rather than "oe," or vice-versa. The electronic device may be programmed with pre-set orders for one or more combinations of keys, or for all possible combinations of keys. Such pre-set orders may be stored, for example, in memory 110. In some embodiments, a device administrator or device user may program the pre-set orders and further, in some embodiments, the pre-set orders may be changed. In one embodiment, the pre-set orders may be changed based on their accuracy over time. For example, if the pre-set order for a given pair of keys was not accepted by the electronic device user (e.g., the opposite order of the characters was entered by the user), the pre-set order may be automatically updated.

In a fourth example of a rule, the processor 102 may use a word prediction engine to identify a word prediction candidate based on the characters corresponding to the touched keys (e.g., the first character and the second character) and any previously-entered characters. The order for previewing would then be set to the order of the characters corresponding to the touched keys in the word prediction candidate. For example, in FIG. 3B, touches may be sensed on the "W" key 365 and the "O" key 385. A word prediction engine may predict that, based on one or more of the previously entered characters ("She said that h") that the word "how" is acceptable, or in some embodiments, the most-likely, word prediction candidate. In this case, the preview 392 shows "ow" rather than "wo." In some embodiments, the word prediction engine may determine that a word prediction candidate comprises more letters than are previously-entered and touched. For example, in FIG. 3B, a word prediction candidate based on the previously-entered "h" and touched "O" key 385 and "W" key 365, may be the word "however" and the entire remainder of the word "however" may be displayed in preview 392. In some embodiments, the user can accept the word prediction candidate by pressing any key on keyboard 320, such as space bar 370, or can select a different key (e.g., a backspace key) for a new word prediction candidate. Further, in some embodiments, several candidates may be previewed, and the characters corresponding to the touched keys may be further differentiated from the remainder of the characters by yet another alternate format in the preview. For example, both the words "how" and "however" may be previewed with ghosted characters, where the "o" and "w" are ghosted and underlined.

In some embodiments, less than the entire word prediction candidate may be shown as a preview. In such an embodiment, not shown, if the keys corresponding to the letter "L" and "W" were touched following the entry of the letter "h," the word prediction engine may return "hollow" as a word prediction candidate, and the "L" and "W" may be previewed as "lw" because that is the order in which the two letters appear in the word "hollow."

Word prediction candidates may be identified based on various criteria and methods. In some embodiments, word prediction candidates may be drawn from a dictionary stored within device 100, for example, in memory 110. In other embodiments, candidates may be ranked based on various factors, which may include, but are not limited to, rate of previous usage by the user, context from other in put words received, geographical location of the user, etc.

In a fifth example of a rule, the processor 102 may determine which of the keys was touched first in time, and may order the previewed characters in the order that they were touched. In FIG. 3B, for example, digit 350 may have touched the "W" key 365 after digit 370 touched the "O" key 385. Processor 102, therefore, shows a preview 392 of the characters "ow." Processor 102 may accomplish this by assigning time-stamps to the touches, or by other known means of tracking the time for each touch. When touches are simultaneous, some embodiments may use an alternate rule, such as one of the other rules disclosed herein. A threshold time difference may be set to differentiate simultaneous touches from non-simultaneous touches.

In some instances, processor 102 may detect a touch on a key associated with a previously-entered character. In many instances, the user has caused this touch to occur not because he intends to enter the associated character into the information entry field, but rather because he has yet to move a digit away from the key associated with the previously-entered character. For example, a user entering the word "doggy," may have previously-entered the characters "do" into the information entry field, and may have digits resting on the "O" key, "G" key, and "Y" key. In this example, ignoring the detected touch on the "O" key, and previewing only the "G" and "Y" characters, may provide an advantage because the word "doggy" does not require an additional "O" character. Thus, in some embodiments, the disclosed methods and systems may be configured to ignore touches associated with one or more previously-entered characters when determining the order for previewing characters, when displaying a preview of the characters, or both when determining the order and displaying the previewed characters. In these embodiments, the previewed characters would not include one or more of the previously-entered characters despite that the processor 102 detected touches on the associated keys.

In some such embodiments, an administrator or user may select a setting to enable a feature where touches of keys associated with previously-entered characters are ignored. Further, in some embodiments, the number of previously-entered characters to ignore may be configurable. For example, to the system may be configured to ignore up to three previously-entered characters. In still other embodiments, processor 102 may ignore touches of keys associated with previously-entered characters within a certain time-window. In the foregoing example, processor 102 may be configured to ignore touches of keys associated with one or more previously-entered characters within the last 0.25 seconds.

Further, in embodiments where a word prediction engine is used, the engine may identify a word selection candidate that requires the characters associated with the touched key that would normally be ignored in the forgoing embodiment. In these cases, processor 102 may be configured to override a rule to ignore touches. For example, if a user entered "dog" in the information entry field, and processor 102 detects touches on the "G" and "Y" keys, a word prediction engine may identify the word "doggy," and may be configured to override the "ignoring" of the touch on the key associated with the previously-entered character "G" because the additional "G" is desirable to complete the word prediction candidate.

As shown in FIGS. 3A and 3B, keyboard 320 is a standard QWERTY keyboard layout; however, any keyboard layout can be displayed for use in the device, such as AZERTY, QWERTZ, or a layout based on the International Telecommunication Union (ITU) standard (ITU E.161) having "ABC" on key 2, "DEF" on key 3, and so on. Keyboard 320 may include various input members that can provide different inputs, such as punctuation, letters, numbers, enter or return keys, and function keys. While keyboard 320 is shown as having a square shape, it can have any other shape (such as an oval).

Embodiments are represented as a software product stored in a machine-readable medium (also referred to as a computer-readable medium, a processor-readable medium, or a computer-usable medium having a computer-readable program code embodied therein). The machine-readable medium is any suitable tangible medium, including a magnetic, optical, or electrical storage medium including a diskette, compact-disk read-only memory (CD-ROM), memory device (volatile or nonvolatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

While the embodiments here described are directed to particular implementations of the communication device and the method of controlling the communication device, one should understand that modifications and variations can occur to those skilled in the art. All such modifications and variations are believed to be within the sphere and scope of the present disclosure.

What is claimed is:

1. A method for operating an electronic device having a physical keyboard with a plurality of physical keys, the physical keyboard capable of detecting a touch of at least one physical key without a depression required for entry of a character associated with the physical key and that meets or exceeds a preview threshold, the method comprising:
   detecting a first touch of a first physical key associated with a first character on the physical keyboard without the depression required for entry of the first character and that meets or exceeds the preview threshold;
   detecting a second touch of a second physical key corresponding to a second character on the physical keyboard without the depression required for entry of the second character and that meets or exceeds the preview threshold;
   determining an order for previewing the first and second characters in response to the detecting, wherein determining the order for previewing the first and second characters comprises using a word prediction engine to identify the word prediction candidate based on the first character, the second character, and the previously-entered characters, wherein the order for previewing the first and second characters is an order of the first and second characters in the word prediction candidate; and
   displaying a preview of the first and second characters in the determined order next to previously-entered characters in an information entry field of the electronic device, the previously-entered characters entered with a depression required for entry, the preview of the first and second characters and the previously-entered characters forming a single word prediction candidate.

2. The method of claim 1, wherein the method further comprises:
   detecting a third touch of a third physical key associated with a third character on the physical keyboard without the depression required for entry of the third character and that meets or exceeds the preview threshold; and
   when the third key is associated with a previously-entered character, ignoring the third character when determining the order for previewing the first and second characters.

3. The method of claim 1, wherein whether the preview threshold is met or exceeded is evaluated on at least one of:
   a depression amount of a physical key less than the amount that is required for entry of the character associated with the key; and
   a presence on a physical key without a depression of the physical key.

4. The method of claim 1, wherein the preview threshold comprises at least one of a time threshold, a force threshold, an actuation threshold, and a capacitive threshold associated with a touch.

5. An electronic device having a display and a physical keyboard with a plurality of physical keys, the physical keyboard capable of detecting a touch of at least one physical key without a depression required for entry of a character associated with the physical key and that meets or exceeds a preview threshold, comprising:
   a memory containing instructions; and
   one or more processors configured to execute the instructions to:
      detect a first touch of a first physical key associated with a first character on the physical keyboard without the depression required for entry of the first character and that meets or exceeds the preview threshold;
      detect a second touch of a second physical key corresponding to a second character on the physical keyboard without the depression required for entry of the second character and that meets or exceeds the preview threshold;
      determine an order for previewing the first and second characters in response to the detection, wherein determining the order for previewing the first and second characters comprises using a word prediction engine to identify the word prediction candidate based on the first character, the second character, and the previously-entered characters, wherein the order for previewing the first and second characters is an order of the first and second characters in the word prediction candidate; and
      display a preview of the first and second characters in the determined order next to previously-entered characters in an information entry field of the electronic device, the previously-entered characters entered with a depression required for entry, the preview of the first and second characters and the previously-entered characters forming a single word prediction candidate.

6. The electronic device of claim 5, wherein the one or more processors are configured to execute the instructions to:
   detect a third touch of a third physical key associated with a third character on the physical keyboard without the depression required for entry of the third character and that meets or exceeds the preview threshold; and
   when the third key is associated with a last-entered character, ignore the third character when determining the order for previewing the first and second characters.

7. A non-transitory computer-readable storage medium storing one or more programs, the one or more programs comprising instructions, when executed by a computing device having a physical keyboard with a plurality of physical keys, the physical keyboard capable of detecting a touch of at least one physical key without a depression required for entry of a character associated with the physical key and that meets or exceeds a preview threshold, that cause the device to:
   detect a first touch of a first physical key associated with a first character on the physical keyboard without the depression required for entry of the first character and that meets or exceeds the preview threshold;
   detect a second touch of a second physical key corresponding to a second character on the physical keyboard without the depression required for entry of the second character and that meets or exceeds the preview threshold;
   determine an order for previewing the first and second characters in response to the detection, wherein determining the order for previewing the first and second characters comprises using a word prediction engine to identify the word prediction candidate based on the first character, the second character, and the previously-entered characters, wherein the order for previewing the first and second characters is an order of the first and second characters in the word prediction candidate; and
   displaying a preview of the first and second characters in the determined order next to previously-entered characters in an information entry field of the device, the previously-entered characters entered with the depression required for entry, the preview of the first and second characters and the previously-entered characters forming a single word prediction candidate.

* * * * *